G. H. DAY.
LENS CONNECTING MEMBER.
APPLICATION FILED MAR. 9, 1915.
1,180,701.
Patented Apr. 25, 1916.
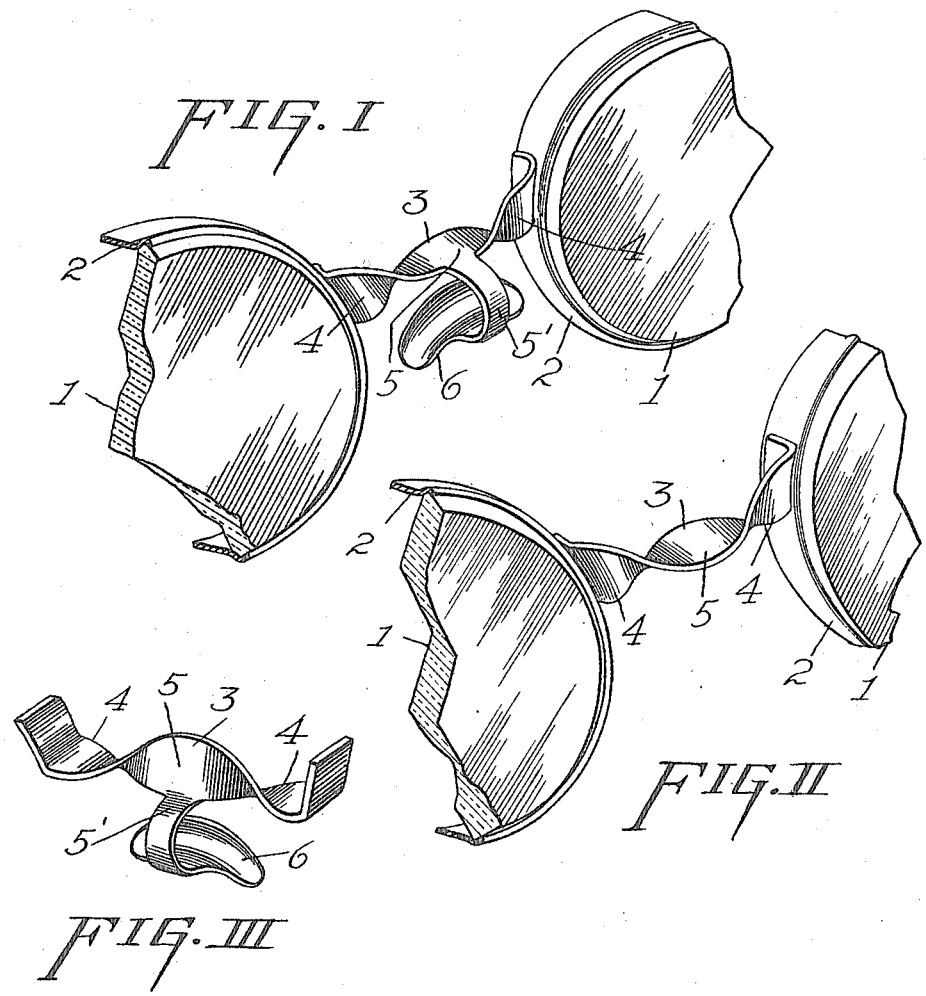
WITNESSES:
INVENTOR
GEORGE H. DAY
BY
ATTORNEYS

UNITED STATES PATENT OFFICE.

GEORGE H. DAY, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

LENS-CONNECTING MEMBER.

1,180,701.      Specification of Letters Patent.      Patented Apr. 25, 1916.

Application filed March 9, 1915. Serial No. 13,240.

*To all whom it may concern:*

Be it known that I, GEORGE H. DAY, a citizen of the United States, residing at Southbridge, in the county of Worcester and State of Massachusetts, have invented certain new and useful Improvements in Lens-Connecting Members, of which the following is a specification.

This invention relates to an improvement in lens connecting members for eyeglasses, spectacles, goggles, or the like, and has for its primary object to provide a member for this purpose which will permit universal adjustment of the lenses so as to adapt a standard size of eyeglass, goggle, or the like, to the requirement of the individual wearer thereof.

Another object is to provide a member of this character which, while permitting of universal adjustment, is strong and durable and holds the lenses in rigid relation one with the other.

With these and other objects in view, the invention consists in the novel features of construction, combination and arrangement of parts, as will be hereinafter more fully described, illustrated in the accompanying drawings, and claimed.

In the drawings: Figure I is a fragmentary perspective view of a portion of a pair of lenses showing the connecting member associated therewith; Fig. II is a similar view of a connecting member with the nose rest left off; and Fig. III is a perspective view of a slightly modified form of connecting member.

Referring to the drawings by numerals, 1—1 designates the lenses, and 2, the ordinary frames which are associated therewith.

The improved connecting member or bridge, designated 3, is preferably formed from a blank of flat pliable material which is preferably of a width substantially the same as the width of the frame 2. In order to permit the lenses to be adjusted universally with respect one to the other, the ends of the member 3 are bent at right angles to the central portion thereof, as indicated at 4, the central portion 5 preferably being disposed in a horizontal plane, and the ends 4 in a vertical plane, although I do not wish to be limited to this particular construction, as the ends may be disposed in a horizontal plane and the central portion disposed in a vertical plane, as illustrated in Fig. III of the drawings, the terminal ends of the member being bent at right angles to the vertically extending portion for engagement with the lens frames 2, the ends being preferably soldered to the frame 2, although they may be secured thereto in any other suitable manner.

If desired, the connecting member 3 may have a laterally extending offset portion 5' formed thereon, terminating in a substantially T-shaped nose engaging portion 6, the portion 5' being adapted to be bent downwardly and curved inwardly to permit the nose engaging portion 6 to lie inwardly beyond the plane of the lenses 1.

It will be obvious from the construction illustrated that the central horizontally extending portion 3 will permit the lenses to be adjusted in a vertical plane, while the vertically extending portion 4 will permit the lenses to be adjusted in a horizontal plane, the twist in the member providing for adjustment of the lenses in other planes, the nose rest 6 being of an ordinary construction and adjustable in the ordinary manner.

In Fig. III there has been illustrated a slightly modified form of connecting member. In this form the central portion 3 instead of being disposed in a horizontal plane is disposed in a vertical plane, and the end portions 4 instead of being disposed in a vertical plane are disposed in a horizontal plane, the construction otherwise remaining the same.

From the foregoing description taken in connection with the accompanying drawings, it is thought that the construction and operation of the device will be clearly understood, and while I have herein shown and described one specific form of my invention, I do not wish to be limited thereto, except to such limitations as the claims may import.

I claim:

1. In an ophthalmic mounting, the combination with lens engaging members, of means for connecting said members, comprising a substantially horizontally disposed bridge member of flat material having the central and end portions thereof disposed in planes at right angles one to the other, whereby the portion disposed in one plane permits of horizontal relative adjustment of the lens engaging members and the portion in the other plane permits of relative in and out adjustment of the lens engaging members, the central portion of said connecting member having an arm of flat material curving forwardly and downwardly therefrom and terminating in a reversely extending portion bearing an integral crest pad, substantially as and for the purpose described.

2. In an ophthalmic mounting the combination with a pair of widened frames engaging the lenses, of a lens connecting member formed from a strip of flat material twisted to dispose the central portion thereof in one plane and the end portions in another plane to permit of ready adjustment of the parts, the ends of the terminal portions being bent at right angles to the plane of said terminal portions and being secured throughout their entire extent to the wide lens engaging frames, substantially as and for the purpose described.

3. As an article of manufacture, an ophthalmic mounting, comprising a pair of widened frames engaging the lenses, a lens connecting member formed from a strip of flat material twisted to dispose the central portion thereof in one plane and the end portions in another plane to permit of ready adjustment of the parts, the ends of the terminal portions being bent at right angles to the plane of said terminal portions and being secured throughout their entire extent to the wide lens engaging frames, the central portion of the lens frame connecting member having an arm or finger curving forwardly and downwardly therefrom, said finger being reversely curved and terminating in a widened transversely curved crest engaging pad for supporting the weight of the mounting, substantially as illustrated.

In testimony whereof I affix my signature in presence of two witnesses.

GEORGE H. DAY.

Witnesses:
JOSEPH J. DEMERS,
CARROLL BAILEY.

Copies of this patent may be obtained for five cents each, by addressing the "Commissioner of Patents, Washington, D. C."